Patented Apr. 1, 1952

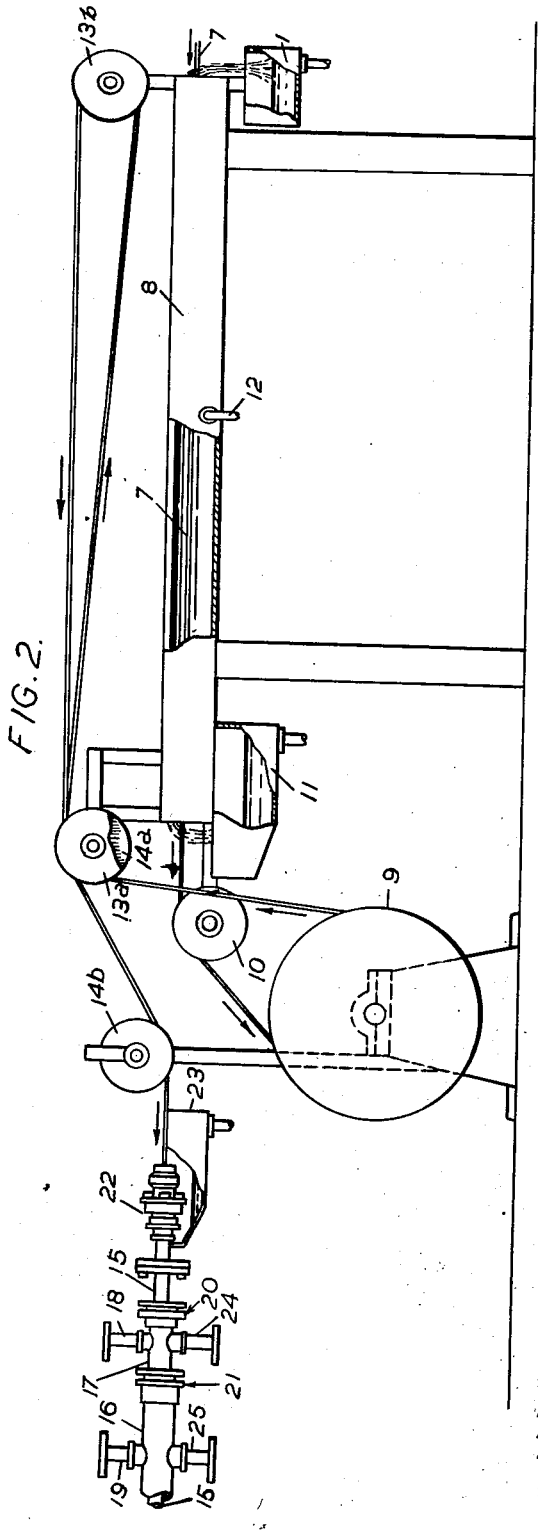

2,591,608

UNITED STATES PATENT OFFICE 2,591,608

APPARATUS FOR COVERING ELECTRIC CONDUCTORS AND CABLE CORES WITH RUBBER OR SIMILAR MATERIAL

Arthur Bruce Fraser Gillespie Richardson, Eustace Tunnicliff, and Ivan Kenneth Fisher, Leigh, England, assignors to British Insulated Callender's Cables Limited, London, England, a British company Application September 21, 1949, Serial No. 116,996 In Great Britain October 11, 1948

2 Claims. (Cl. 18—6)

This invention relates to the application of a covering of rubber to a core, which may be a wire conductor or a cable core, of great length and to the vulcanising of the applied covering, as a continuous manufacturing process. Processes of this kind are known in which the covering is extruded on the core, usually by an extrusion machine of the rotating feed screw type, and is vulcanised as the covered conductor or core is travelling to a take-up reel by passing it either directly into and through a long vulcanising chamber of which one end is coupled in a steam tight manner to the delivery head of the extruder or by passing it into and through a long vulcanising chamber which is provided with some form of seal at its inlet as well as its outlet end and which is spaced from but in alignment with the axis of the delivery head of the extruder. With the first mentioned type of machine, monitoring of the process is tardy since the product cannot be observed until it has left the vulcanising chamber, which to ensure a reasonable speed of production is of the order of 100 to 150 feet long. With the second mentioned type, the product emerging from the extruder can be observed. However this separation of the vulcanising chamber from the extruder introduces difficulties due principally to the change in pressure to which the covered core is subjected before becoming vulcanised. By the present invention we provide an improved form of continuous vulcanising machine by which these and other difficulties are eliminated, and a consistently satisfactory product is obtained.

Our improved apparatus comprises in combination with a screw extrusion machine for applying a rubber covering to a core and a long tubular vulcanising chamber provided with sealing means at its inlet and outlet ends and adapted to contain steam or other fluid under high pressure for vulcanising the covering as the covered core passes through it, a draw-off wheel or capstan or other haul-off device for metering the core into the extrusion machine at constant speed, means comprising an open trough for containing cooling liquid, located between the extruder and the inlet end of the vulcanising chamber, for cooling the hot extruded rubber covering before it enters the sealing means at the inlet end of the vulcanising chamber, a cooling tube forming a continuation of the outlet end of the vulcanising chamber, for containing liquid under substantially the same pressure as that of the steam or other fluid in the vulcanising chamber, a sealing gland at the outlet end of the cooling tube, and for hauling the covered core through the vulcanising chamber and the cooling tube a haul-off device of which the speed is co-ordinated with that of the metering-in haul-off device and from which the cable passes on to a take-up reel or the like.

We prefer to provide a third draw-off wheel or capstan which is located between the outlet end of the cooling trough and the inlet end of the vulcansing chamber and of which the speed is co-ordinated with that of the metering-in capstan.

To enable the invention to be more fully understood, an example of our improved apparatus according to the invention will be described with the aid of the accompanying diagrammatic drawings, wherein Figure 1 is a plan showing the lay-out of the apparatus, Figure 2 is a view, mainly in elevation and on a larger scale than Figure 1, of the cooling trough and the inlet end of the vulcanising tube, Figure 3 is a view, mainly in elevation and on the same scale as Figure 2, of the outlet end of the vulcanising tube and the cooling tube connected to it, and Figure 4 is a fragmental view showing an alternative form of haul-off device to that shown in Figure 1.

On referring to Figures 1 and 2, it will be seen that the core 1 to which a covering of rubber is to be applied is drawn off from a drum 2 by a capstan 3 which meters it into the head 4 of a screw extruder 5 driven by a motor 6. In the head 4 a covering of rubber of the required thickness is applied to the core. On leaving the head, the covered core 7 passes into a long open trough 8 through a slot in the neighbouring end wall of the trough, passes along the trough, which is aligned with the axis of the head 4, and out through a similar slot in the other end wall. The trough contains cold water through which the covered core 7 is hauled by means of an intermediate capstan 9, the core being maintained substantially in alignment with the extrusion axis of the head 4 by a guide pulley 10 so that it passes into and out of the trough without touching the slotted end walls of the trough. Water escaping through the slots in the end walls flows into catch boxes 11 and is returned to a storage tank for cooling. The level of water and the temperature of the bath are maintained approximately constant by supplying cold water through an inlet pipe 12 at an appropriate rate. From the capstan 9 the water-cooled covered core into the path of travel of the work. Figure 4 shows an example of a capstan of this kind. The capstan, designated 35a, is slidable along a splined portion of its driving axle 41 and has four work-engaging surfaces each of slightly different diameter from the others. It is adapted, as by a spring loaded bolt 42, to be locked on its axle in any one of four positions in which the work is engaged by a step of appropriate diameter. In place of capstans having stepped peripheries capstans having slightly tapering rims may be used.

In cases where the conductor or core is to be subjected to vacuum before its covering is applied, we fit a vacuum seal 39 of any suitable kind to the rear end of the core tube 40 of the extrusion machine or to an extension thereof and evacuate the interior of the core tube. The core tube 40 may be water-cooled to compensate for the reduced cooling effect resulting from the evacuation of air from its interior.

By means of our improved apparatus we are able to manufacture continuously rubber covered conductors and rubber sheathed cables of exceptionally accurate dimensions, having an exceptionally good finish, and consistently free from faults of all descriptions.

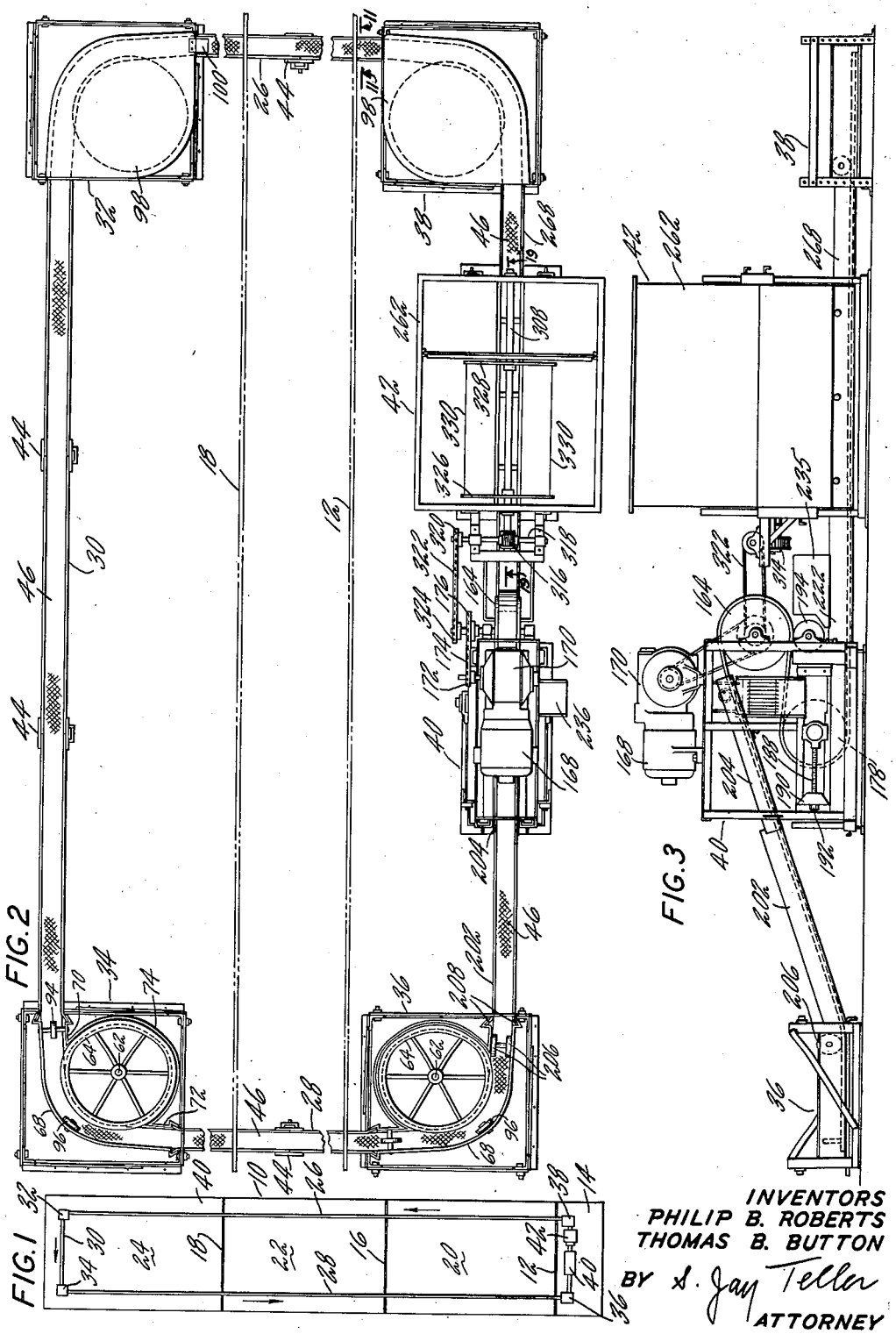

What we claim as our invention is:

1. Apparatus for applying a covering of rubber to and vulcanising it on a core of great length, comprising in combination with a screw extruding machine for applying a rubber covering to the core and a long tubular vulcanising chamber provided with sealing means at its inlet and outlet ends and adapted to contain fluid under high pressure for vulcanising the covering as the covered core passes through it, a haul-off device for metering the core into said extruding machine at constant speed, an open trough, located between said extruding machine and the inlet end of said vulcanising chamber, for containing cooling liquid for cooling the hot extruded covering before it enters the sealing means at the inlet end of said vulcanising chamber, a cooling tube forming a continuation of the outlet end of said vulcanising chamber and containing a body of cooling liquid which throughout its length is under substantially the same pressure as that of the fluid in said vulcanising chamber, a sealing gland at the outlet end of said cooling tube, and for hauling the covered core through said vulcanising chamber and said cooling tube a haul-off device of which the speed is co-ordinated with that of the first said haul-off device.

2. Apparatus for applying a covering of rubber to and vulcanising it on a core of great length, comprising in combination with a screw extruding machine for applying a rubber covering to the core and a long tubular vulcanising chamber provided with sealing means at its inlet and outlet ends and adapted to contain fluid under high pressure for vulcanising the covering as the covered core passes through it, an open trough, located between said extruding machine and the inlet end of said vulcanising chamber, for containing cooling liquid, means for metering the core through said extruding machine and through cooling liquid in said trough, at constant speed and under constant tension, comprising a metering-in haul-off device for acting upon the core before it enters the said extruding machine and an intermediate haul-off device for acting upon the liquid-cooled, rubber-covered core before it enters said vulcanising chamber, a cooling tube forming a continuation of said vulcanising chamber, a sealing gland at the outlet end of said cooling tube whereby said cooling tube is adapted during the passage of the rubber covered core there through to contain cooling liquid under substantially the same pressure as that of the fluid in the vulcanising chamber, a haul-off device for hauling the covered core through said vulcanising chamber and said cooling tube, and means for varying the relative peripheral speeds of the work-engaging surfaces of the three haul-off devices over a small range to suit the size and type of covered core being produced.

ARTHUR BRUCE FRASER GILLESPIE
RICHARDSON.
EUSTACE TUNNICLIFF.
IVAN KENNETH FISHER.

REFERENCES CITED

The following references are of record in the file of this patent:

UNITED STATES PATENTS

| Number | Name | Date |
|---|---|---|
| 277,018 | Eddy | May 8, 1883 |
| 1,288,111 | Milne | Dec. 17, 1918 |
| 1,689,206 | Lamplough | Oct. 30, 1928 |
| 1,999,751 | Clayton | Apr. 30, 1935 |
| 2,069,087 | Forstrom et al. | Jan. 26, 1937 |
| 2,286,922 | Muller | June 16, 1942 |
| 2,369,858 | Ryan | Feb. 20, 1945 |
| 2,414,524 | Harris et al. | Jan. 21, 1947 |